(12) United States Patent
Gallagher et al.

(10) Patent No.: US 11,879,813 B2
(45) Date of Patent: Jan. 23, 2024

(54) LEAK DETECTION DEVICE

(71) Applicant: Transportation IP Holdings, LLC, Norwalk, CT (US)

(72) Inventors: Shawn Gallagher, Erie, PA (US); Pisey Leute, Waterford, PA (US); Manuel Licon Flores, Erie, PA (US); Jesse Brigden, Erie, PA (US); Sudheer Khanapure, Bengaluru (IN)

(73) Assignee: TRANSPORTATION IP HOLDINGS, LLC, Norwalk, CT (US)

( * ) Notice: Subject to any disclaimer, the term of this patent is extended or adjusted under 35 U.S.C. 154(b) by 343 days.

(21) Appl. No.: 17/471,259

(22) Filed: Sep. 10, 2021

(65) Prior Publication Data
US 2022/0090981 A1    Mar. 24, 2022

Related U.S. Application Data

(60) Provisional application No. 63/082,535, filed on Sep. 24, 2020.

(51) Int. Cl.
*G01M 3/28* (2006.01)
*G01M 3/32* (2006.01)
*B33Y 80/00* (2015.01)

(52) U.S. Cl.
CPC ............ *G01M 3/2807* (2013.01); *G01M 3/32* (2013.01); *B33Y 80/00* (2014.12)

(58) Field of Classification Search
None
See application file for complete search history.

(56) References Cited

U.S. PATENT DOCUMENTS

2015/0143876 A1* 5/2015 Dohi .................... G01M 3/243
73/40

FOREIGN PATENT DOCUMENTS

| CN | 109186893 A | 1/2019 |
| RU | 2536093 C2 | 12/2014 |

OTHER PUBLICATIONS

Search Report dated Apr. 25, 2022 for corresponding Eurasian Application No. 2019129520; English translation provided (4 pages).

* cited by examiner

*Primary Examiner* — Harshad R Patel
*Assistant Examiner* — Gedeon M Kidanu
(74) *Attorney, Agent, or Firm* — The Small Patent Law Group LLC; Christopher R. Carroll (57) ABSTRACT

A leak detection device includes a body having at least one fluid input that receives a fluid leak, at least one drain fluidly coupled with a container, and at least one sensor conduit input fluidly coupled with at least one sensor. The fluid input is located above the drain but below the sensor conduit input. The body includes an internal conduit that is fluidly coupled with and extends between the fluid input, the drain, and the sensor conduit input. The internal conduit includes a lower branch that extends below the fluid input to the drain. The internal conduit includes an upper branch that separately extends in the body above the sensor conduit input to the drain. The lower branch includes a reduced flow portion below the fluid input and the sensor conduit input but above the drain.

20 Claims, 6 Drawing Sheets

LEAK DETECTION DEVICE

CROSS-REFERENCE TO RELATED APPLICATIONS

This application claims priority to U.S. Provisional Application No. 63/082,535, which was filed on 24 Sep. 2020, and the entire disclosure of which is incorporated herein by reference.

BACKGROUND

Technical Field

The subject matter described herein relates to devices that direct and/or detect fluid leaks.

Discussion of Art

Some powered systems have fluids directed throughout the systems for various purposes. For example, vehicles can have fuel lines directing fuel to engines, coolant directed through hoses to cool components of the vehicles, and the like. Some of these fluids may flow at higher pressures within the powered systems. Leaks in the lines, pipes, hoses, etc. (e.g., conduits) of the powered systems, as well as interfaces between different conduits, can occur. Due to the complex nature and the large number of components, however, detection of a leak can be difficult.

Some vehicles use a common rail fuel system that captures unintended leakage of fuel and returns the leaking fuel to a suitable place (e.g., the fuel tank of the vehicle). In terms of high pressure fuel piping, these systems can be referred to as "double wall". The double wall piping has a second pipe around the main high pressure pipe to capture leakage in the main pipe or joints. Other high pressure common rail parts, such as pumps, injectors, accumulators, junction fittings, etc. have also incorporated designs to capture leakage. It is beneficial in common rail systems to collect these leakages to detect an unacceptable leak and take appropriate action.

One solution to such leaks is a leakage collection tank into which the leaking fluid is directed. This tank may be closed except for the inlet through which the leaking fluid is directed into the tank. A sensor may be disposed in the tank to detect the leaking fluid once the amount of the leaking fluid that has accumulated in the tank reaches the sensor. But, these types of tanks may not have an outlet and, as a result, are able to only collect a fixed amount of the leaking fluid. For faster leaks directing more fluid into the tank, the tank can quickly become overfilled with the leaking fluid. Some such tanks do have an orifice drain added that can direct the accumulated fluid back to a fuel tank. But, these types of tanks typically do not have common parts and can be expensive to manufacture. Other solutions include a complex web of conduits and fittings that collect leaks and direct the leaks to sensors, tanks, etc. But, these solutions tend to be overly complex and add to the number of failure points where additional leaks may occur.

BRIEF DESCRIPTION

In one embodiment, a leak detection device includes a body having at least one fluid input configured to receive a fluid leak from a first source container, at least one drain configured to be fluidly coupled with one or more of the first container that is a source of the fluid leak or a different, second source container, and at least one sensor conduit input configured to be fluidly coupled with at least one sensor. The at least one fluid input is disposed in the body above the at least one drain but below the at least one sensor conduit input in the body. The body includes an internal conduit that is fluidly coupled with and extends between the at least one fluid input, the at least one drain, and the at least one sensor conduit input. The internal conduit includes a lower branch that extends in the body below the at least one fluid input to the at least one drain. The internal conduit includes an upper branch that separately extends in the body above the at least one sensor conduit input to the at least one drain. The lower branch of the internal conduit includes a reduced flow portion having a smaller cross-sectional size than the upper branch of the internal conduit. The internal conduit has the reduced flow portion below the at least one fluid input and the at least one sensor conduit input but above the at least one drain.

In one embodiment, a method includes additively manufacturing a body having at least one fluid input configured to receive a fluid leak from a first source container, at least one drain configured to be fluidly coupled with one or more of the first source container or a different, second source container, and at least one sensor conduit input configured to be fluidly coupled with at least one sensor. The at least one fluid input is additively manufactured in the body above the at least one drain but below the at least one sensor conduit input in the body. The body is additively manufactured to include an internal conduit that is fluidly coupled with and extends between the at least one fluid input, the at least one drain, and the at least one sensor conduit input. The internal conduit is additively manufactured to include a lower branch that extends in the body below the at least one fluid input to the at least one drain. The internal conduit is additively manufactured to include an upper branch that separately extends in the body above the at least one sensor conduit input to the at least one drain. The lower branch of the internal conduit is additively manufactured to include a reduced flow portion having a smaller cross-sectional size than the upper branch of the internal conduit. The internal conduit is additively manufactured to have the reduced flow portion below the at least one fluid input and the at least one sensor conduit input but above the at least one drain.

In one embodiment, a vehicle fuel leak detection device includes a body having at least one fluid input configured to receive a fuel leak onboard a vehicle, at least one drain configured to be fluidly coupled with a fuel tank of the fuel, and a first sensor conduit input configured to be fluidly coupled with a fluid sensor. The at least one fluid input is disposed in the body above the at least one drain but below the at least one sensor conduit input in the body. The body includes an internal conduit raceway that is fluidly coupled with and extends between the at least one fluid input, the at least one drain, and the at least one sensor conduit input. The internal conduit includes a lower branch that extends in the body below the at least one fluid input to the at least one drain. The internal conduit includes an upper branch that separately extends in the body above the at least one sensor conduit input to the at least one drain. The lower branch of the internal conduit includes a reduced flow portion having a smaller cross-sectional size than the upper branch of the internal conduit. The internal conduit has the reduced flow portion below the at least one fluid input and the at least one sensor conduit input but above the at least one drain.

BRIEF DESCRIPTION OF THE DRAWINGS

The inventive subject matter may be understood from reading the following description of non-limiting embodiments, with reference to the attached drawings, wherein below.

DETAILED DESCRIPTION

Embodiments of the inventive subject matter described herein relate to leak detection and/or direction devices that collect fluid leaks, direct the leaks to a container, and optionally include sensor(s) to sense one or more characteristics of the leaks. The devices can be additively manufactured to provide a relatively small block or body that can receive one or more inputs of fluid leak, provide outputs to the sensors(s), and that include one or more drains to a source tank (where the fluid that is leaking came from) or another tank (e.g., an engine sump, a waste collection tank, etc.) all inside of one monolithic, homogenous, and/or seamless body. The additively manufactured devices can be relatively inexpensive to manufacture, and the sizes, fittings, and the like, of the devices can be easily customized during additive manufacture of the devices.

Figure 1:
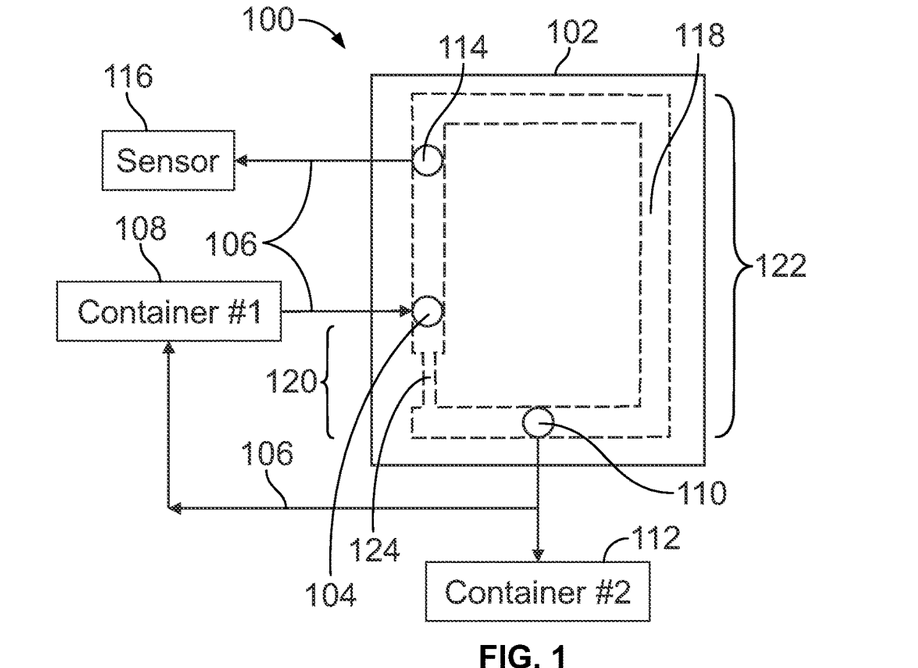
FIG. 1 schematically illustrates one embodiment of a leak detection and/or direction device.

FIG. 1 schematically illustrates one embodiment of a leak detection and/or direction device 100. The device can be additively manufactured by successively printing or laying individual layers of material on top of each other to form a monolithic, optionally homogeneous, and/or seamless body. The device can be mounted to a powered system, such as a vehicle, in a location where leaks of a fluid (e.g., fuel) can be directed for detection and optionally to be directed by the device back to a source of the fluid (e.g., the fuel tank) or another container.

The device includes an additively manufactured body 102 having at least one fluid input 104. Alternatively, the body may not be additively manufactured. The fluid input can be an orifice that is coupled with one or more conduits 106 that directly or indirectly fluidly couple a first source container 108 with the body. The first source container can be a fuel tank or other container. The conduits can be hoses, pipes, lines, or the like. In one embodiment, the conduit that is coupled with the fluid input of the body can be an outer conduit that is disposed around an inner conduit, where the inner conduit directs the flow of a fluid (e.g., fuel) and the outer conduit collects and directs the flow of portions of the fluid that leak out of the inner conduit.

The body also includes at least one drain 110 that is fluidly coupled with the first container and/or a different, second container 112 by one or more conduits. For example, the drain can be fluidly coupled with the fuel tank to return leaking fluid flowing through the body to the fuel tank, or may be fluidly coupled with an engine sump, a waste container, or the like, that collects the leaking fluid without returning the leaking fluid to the source container.

The body may include at least one sensor conduit input 114 that is fluidly coupled with at least one sensor 116. Alternatively, the body may not include the sensor conduit input. The sensor conduit input can fluidly couple with the sensor via the one or more conduits so that at least some of the fluid in the body reaches the sensor. The sensor can measure or sense one or more characteristics of the fluid in the body. For example, the sensor can be a fluid level sensor, a float switch, a pressure sensor, or the like, that can detect the presence of the fluid, a pressure of the fluid, or the like.

The body includes at least one internal conduit 118 that is fluidly coupled with and extends between the fluid input(s), the drain(s), and the sensor conduit input(s). This internal conduit can be formed as an open internal passageway within the body that directs the flow of the leaking fluid within the body. The internal conduit includes a lower branch 120 and an upper branch 122.

The lower branch of the internal conduit extends in the body below the fluid input from the fluid input to the drain. In the illustrated embodiment, the lower branch of the internal conduit extends from the fluid input to the drain without intersecting or passing through the sensor input. The upper branch of the internal conduit separately extends in the body above the fluid input from the fluid input, through (or intersecting with) the sensor conduit input, above the sensor conduit input, and down to the drain. The upper branch may not extend below the fluid input from the fluid input to the drain. The upper branch is above at least part of the lower branch relative to the direction in which gravity pulls on the fluid inside the internal conduit. While one or more portions of the upper branch may extend in the body as low as the lower branch, the lower branch does not extend above the entirety of the upper branch, as shown in FIG. 1.

The lower branch of the internal conduit can include a reduced flow portion 124. The reduced flow portion of the lower branch includes a section of the internal conduit in the lower branch that has a smaller cross-sectional area than other sections of the lower branch and/or than the upper branch of the internal conduit, as shown in FIG. 1. The reduced flow portion is located below the fluid input and the sensor conduit input but above the at least one drain in the illustrated embodiment.

As shown, the fluid input can be disposed in the body above the drain but below the sensor conduit input in the body. In operation, the fluid input receives a fluid leak. The fluid leak may initially flow down in the lower branch of the internal conduit from the fluid input toward the reduced flow portion of the lower branch due to the pull of gravity. The fluid may not be pumped or otherwise forced through the internal conduit, but gravity can pull the fluid down from the fluid input. The reduced flow portion of the lower branch can at least partially back-up flow of the fluid leak within the internal conduit so that the fluid leak in the internal conduit accumulates, builds up, etc., and reaches the sensor conduit. For example, the reduced flow portion may have a small cross-sectional size (e.g., half of the size of the internal conduit outside of the reduced flow portion, 10% of the size of the internal conduit outside of the reduced flow portion, etc.) such that some of the fluid in the lower branch can flow through the reduced flow portion to the drain while a remainder of this fluid pools accumulates above the reduced flow portion. The fluid leak can build up above the reduced flow portion and into the upper branch of the internal conduit such that the fluid leak reaches the sensor via the sensor conduit input and the conduit that connects the sensor with the body. This can allow for the sensor to sense or measure the presence of the fluid and/or one or more characteristics of the fluid.

If the fluid continues to accumulate, the raceway or continuous loop formed by the internal conduit inside the body can direct the accumulated fluid above the sensor input, and down to the drain on a side of the body that is opposite the sensor input and fluid input (e.g., the right side of the body in the perspective of FIG. 1). Otherwise, the fluid may drain through the reduced flow portion of the lower branch of the internal conduit to the drain. In either situation, the internal conduit both builds up enough of the fluid to allow for the sensor to sense or measure a characteristic of the fluid, while providing an output (e.g., the drain) to prevent the fluid from building up enough internal pressure inside the body to damage or destroy the body. The internal conduit can be shaped and positioned so that gravity can pull the fluid to the drain without the fluid being pumped or otherwise forced through the internal conduit.

Figure 2:
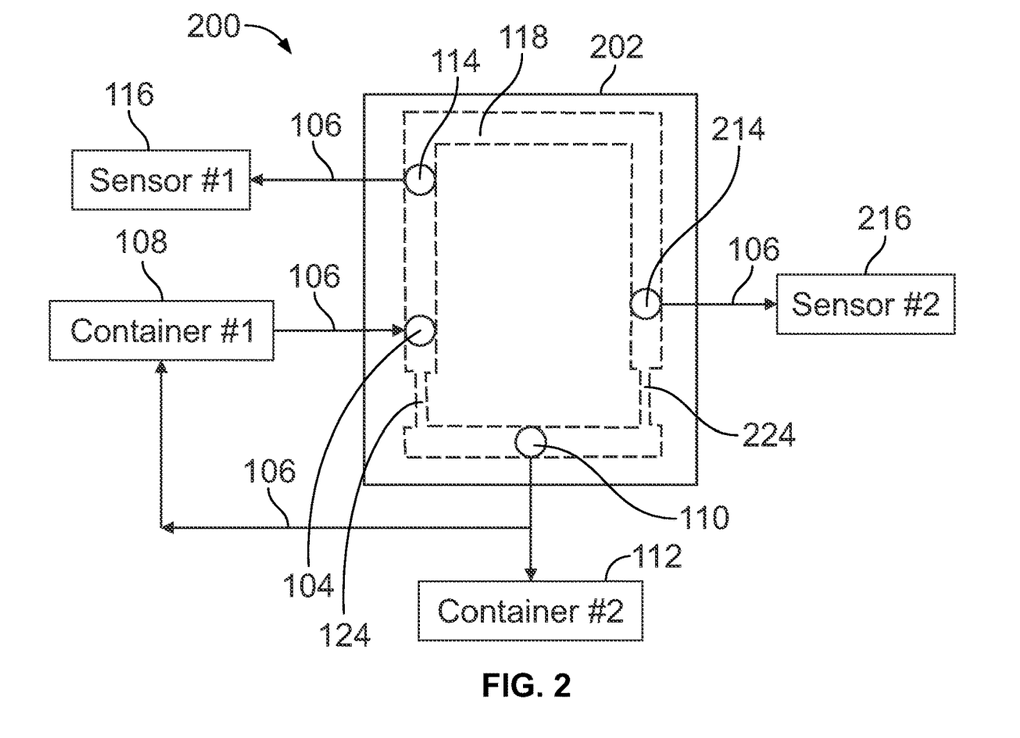
FIG. 2 schematically illustrates another embodiment of a leak detection and/or direction device.

FIG. 2 schematically illustrates another embodiment of a leak detection and/or direction device 200. Similar to the device 100, the device 200 can be additively manufactured by successively printing or laying individual layers of material on top of each other to form a monolithic, optionally homogeneous, and/or seamless body. The device can be mounted to a powered system, such as a vehicle, in a location where leaks of a fluid can be directed for detection and optionally to be directed by the device back to a source of the fluid or another container.

The device includes an additively manufactured body 202 having the fluid input, the sensor conduit input, the internal conduit, the reduced flow portion in the internal conduit, and the drain described above. One difference between the devices shown in FIGS. 1 and 2 is that the device shown in FIG. 2 includes a second sensor conduit input 214 that can be fluidly coupled with a conduit 106 in which a second sensor 216 is disposed and/or is otherwise fluidly coupled. The second sensor can measure or sense the same or different characteristic(s) as the sensor 116 (e.g., the first sensor). For example, the first sensor 116 can detect the presence of the fluid in the internal conduit 118 above the fluid input 104, while the second sensor 216 can measure a pressure (e.g., a fluid pressure) of the fluid in the internal conduit. Alternatively, the second sensor can measure or sense the temperature of the fluid, an identification of the fluid, a conductivity of the fluid, etc.

Alternatively, the sensors 116, 216 may measure or sense the same characteristic. For example both the sensors 116, 216 may detect the presence of the fluid in the internal conduit. The sensor 116 may detect the presence of the fluid before the sensor 216 due to the locations of the sensors 116, 216. Output from the sensor 116 (e.g., to a controller, display device, one or more processors, etc.) can indicate an initial detection of a fluid leak in the powered system that is received by the device 200, while output from the sensor 216 can indicate that the amount of the fluid leak has increased or is above a threshold amount.

The device shown in FIG. 2 optionally may include an additional reduced flow portion 224 in the internal conduit below the second sensor conduit input. The additional or second reduced flow portion of the lower branch of the internal conduit includes another section of the internal conduit in the lower branch that has a smaller cross-sectional area than other sections of the lower branch (other than the first reduced flow portion 124) and/or than the upper branch of the internal conduit, as shown in FIG. 2. Similar or identical to the reduced flow portion 124, the reduced flow portion 224 can be a bottleneck or other constraint on the flow of fluid in the internal conduit. The second reduced flow portion is located below the second sensor conduit input but above the at least one drain in the illustrated embodiment.

The second reduced flow portion of the lower branch can at least partially back-up flow of the fluid leak within the internal conduit so that the fluid leak in the internal conduit accumulates, builds up, etc., and reaches the second sensor conduit. For example, the second reduced flow portion may have a small cross-sectional size (e.g., half of the size of the internal conduit outside of the first and/or second reduced flow portions, 10% of the size of the internal conduit outside of the first and/or second reduced flow portions, etc.) such that some of the fluid in the lower branch can flow through the second reduced flow portion to the drain while a remainder of this fluid pools accumulates above the second reduced flow portion. The fluid leak can build up above the second reduced flow portion and into the upper branch of the internal conduit such that the fluid leak reaches the second sensor via the second sensor conduit input and the conduit that connects the second sensor with the body. This can allow for the second sensor to sense or measure a characteristic (e.g., fluid pressure) of the fluid, while permitting the fluid to continue to drain out of the device 200 via the drain.

While two sensor conduit inputs, two sensors, and two reduced flow portions are shown in FIG. 2, optionally, the device 200 may include more than two sensor conduit inputs, more than two sensors, and/or more than two reduced flow portions.

Figure 3:
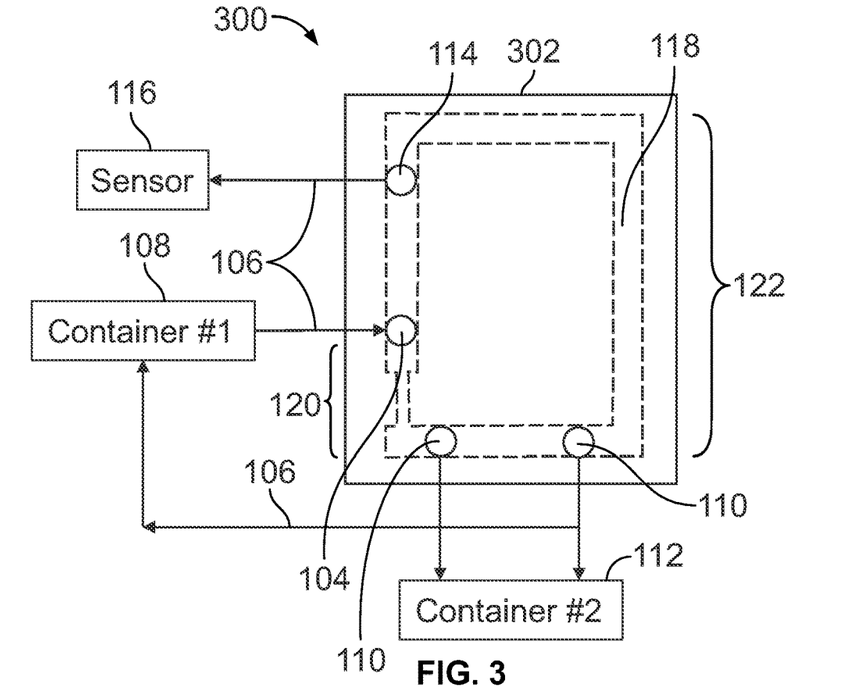
FIG. 3 schematically illustrates another embodiment of a leak detection and/or direction device.

FIG. 3 schematically illustrates another embodiment of a leak detection and/or direction device 300. Similar to the devices 100, 200, the device 300 can be additively manufactured by successively printing or laying individual layers of material on top of each other to form a monolithic, optionally homogeneous, and/or seamless body. The device can be mounted to a powered system, such as a vehicle, in a location where leaks of a fluid can be directed for detection and optionally to be directed by the device back to a source of the fluid or another container.

The device includes an additively manufactured body 302 having the fluid input, the sensor conduit input, and the drain described above. One difference between the devices shown in FIGS. 1 and 3 is that the device shown in FIG. 3 includes more than one drain 110. The multiple drains can be fluidly coupled with the same container 108 or 112, may both or all be fluidly coupled with multiple containers 108 and 112 (e.g., the multiple drains are connected with the same group of containers such that the fluid emptying the body through any of the drains is directed into multiple containers), or may be separately fluidly coupled with different containers (e.g., each drain is connected with a different container such that the fluid exiting the body through a first drain is directed into a first container, the fluid exiting the body through a second drain is directed into a different, second container but not the first container, and so on).

Figure 4:
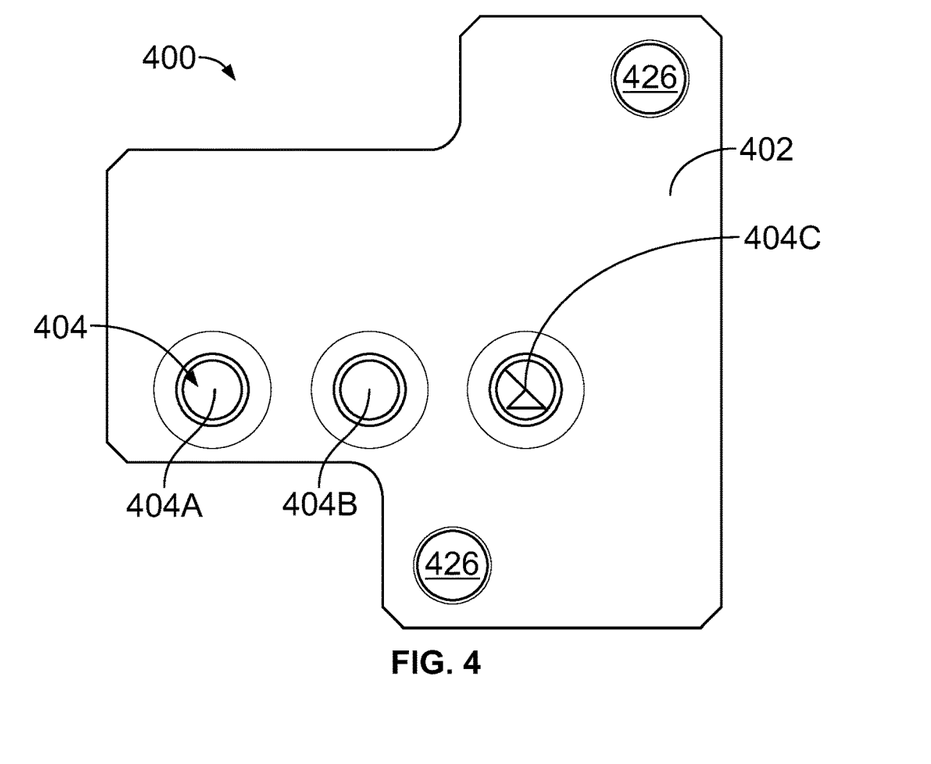
FIG. 4 illustrates a front elevational view of one example of a leak detection and/or direction device.
Figure 5:
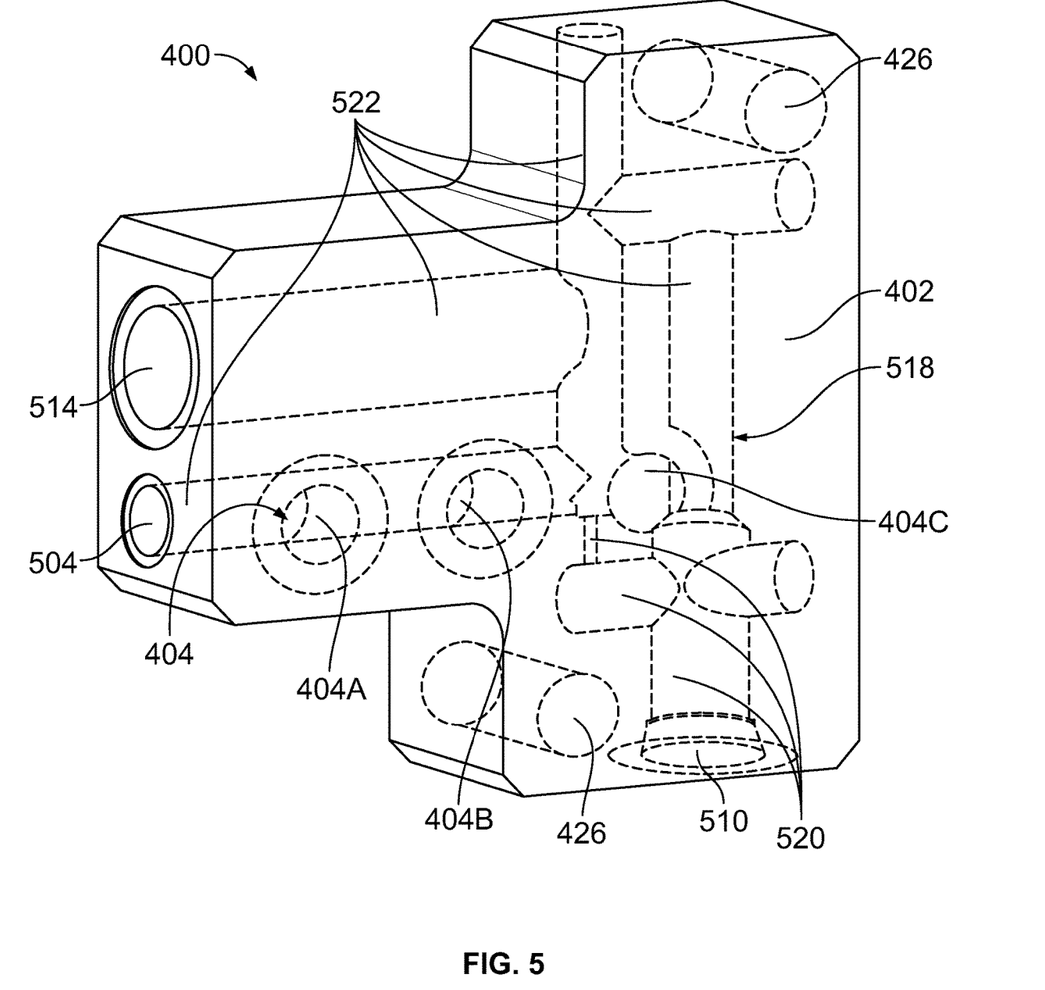
FIG. 5 is a perspective view of the device shown in FIG. 4.
Figure 6:
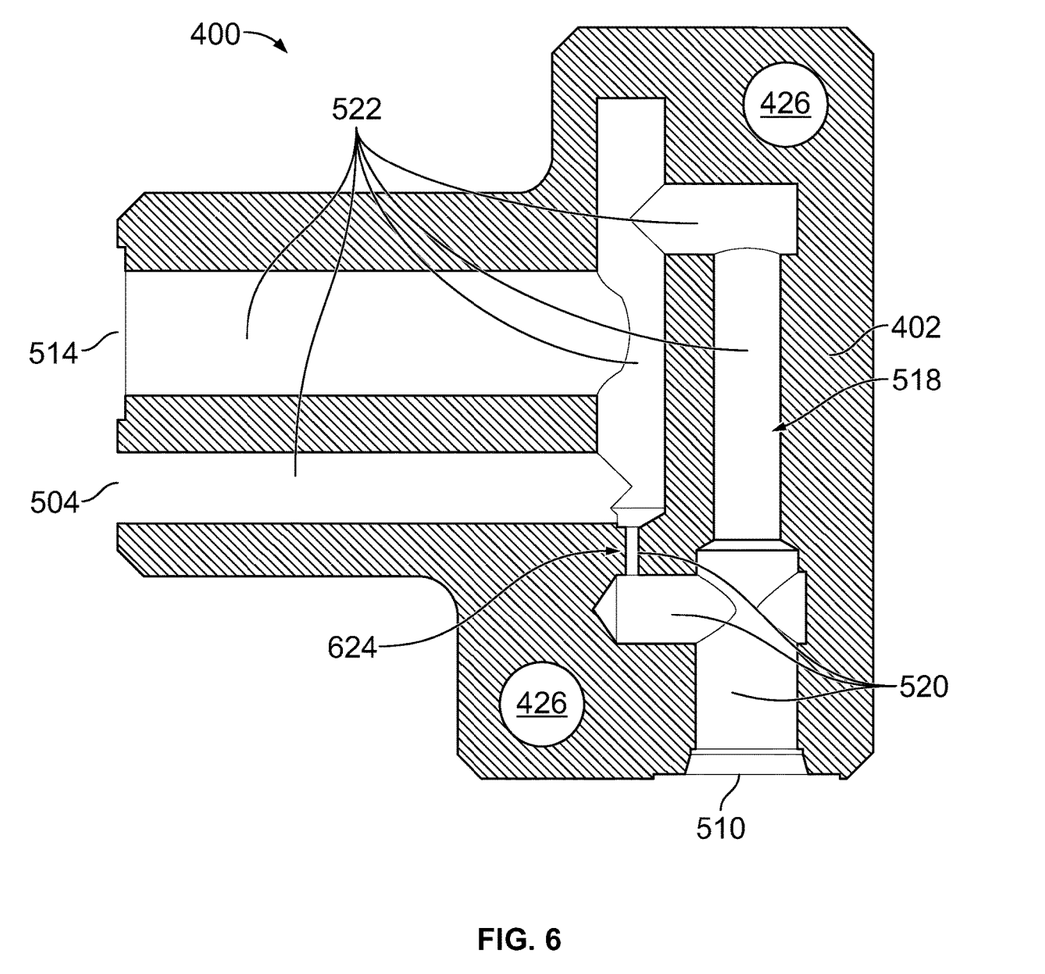
FIG. 6 illustrates a cross-sectional view of the device shown in FIG. 4.

FIG. 4 illustrates a front elevational view of one example of a leak detection and/or direction device 400. FIG. 5 is a perspective view of the device shown in FIG. 4. FIG. 6 illustrates a cross-sectional view of the device shown in FIG. 4. Similar to the devices 100, 200, 300, the device 400 can be additively manufactured by successively printing or laying individual layers of material on top of each other to form a monolithic, optionally homogeneous, and/or seamless body. The device can be mounted to a powered system, such as a vehicle, in a location where leaks of a fluid can be directed for detection and optionally to be directed by the device back to a source of the fluid or another container.

The device includes an additively manufactured body 402 having multiple fluid inputs 404, 504 (e.g., inputs 404A-C). The fluid inputs can represent the fluid inputs 104 described above. Each of the fluid inputs can be fluidly coupled with other conduits 106 (shown in FIG. 1) that separately direct fluid leaks from different locations in a powered system (e.g., a vehicle) to the same internal conduit or channel 518 (shown in FIG. 5) of the body. The internal conduit 518 can represent the internal conduit 118 described above.

The body includes at least one drain 510 (shown in FIG. 5) that can represent the drain 110. The drain can be fluidly coupled with the first container and/or a different, second container by one or more conduits, as described above. The body may include at least one sensor conduit input 514 (shown in FIG. 5) that represents the sensor conduit input 114. The sensor conduit input can be fluidly coupled with at least one sensor 116, as described above.

The body includes the internal conduit that is fluidly coupled with and extends between the fluid input(s), the drain(s), and the sensor conduit input(s). This internal conduit can be formed as an open internal passageway within the body that directs the flow of the leaking fluid within the body. The internal conduit includes lower branches 520 and upper branches 522 (shown in FIG. 5). The lower branches of the internal conduit extend in the body below the fluid input from the fluid input to the drain. In the illustrated embodiment, the lower branches of the internal conduit extend from the fluid input to the drain without intersecting or passing through the sensor input. The upper branches of the internal conduit separately extend in the body above the fluid inputs from the fluid input, through (or intersecting with) the sensor conduit input, above the sensor conduit input, and down to the drain. The upper branches may not extend below the fluid input from the fluid input to the drain. The upper branches can be above at least part of the lower branches relative to the direction in which gravity pulls on the fluid inside the internal conduit.

The lower branches of the internal conduit can include a reduced flow portion 624 (shown in FIG. 6), which represents the reduced flow portion 124. The reduced flow portion of the lower branches includes a section of the internal conduit in the lower branches that has a smaller cross-sectional area than other sections of the lower branches and/or than the upper branches of the internal conduit, as described above.

As shown, at least some of the fluid inputs can be disposed in the body above the drain but below the sensor conduit input in the body. In operation, the fluid inputs receive a fluid leak. The fluid leak may initially flow down in the lower branches of the internal conduit from some of the fluid inputs (e.g., the inputs 404, 504) toward the reduced flow portion of the lower branches due to the pull of gravity. The reduced flow portion of the lower branches can at least partially back-up flow of the fluid leak within the internal conduit so that the fluid leak in the internal conduit accumulates, builds up, etc., and reaches the sensor conduit, as described above.

The body includes several mounting holes 426. These holes may be formed during the additive manufacture of the body in locations that allow for fasteners (e.g., bolts, screws, pins, etc.) to be placed through the mounting holes to secure the body to a surface (e.g., in the powered system).

Figure 7:
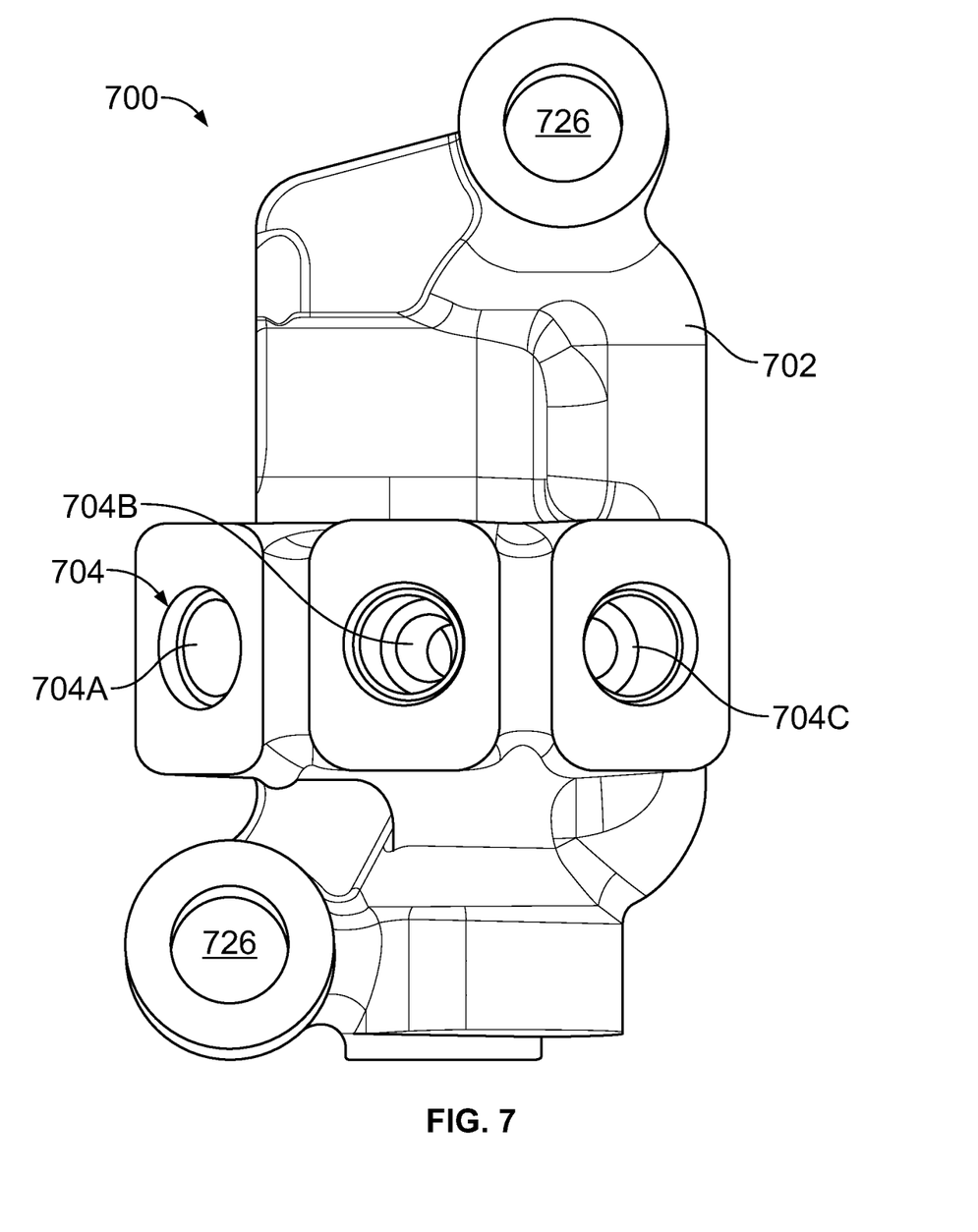
FIG. 7 illustrates a front elevational view of another example of a leak detection and/or direction device.
Figure 8:
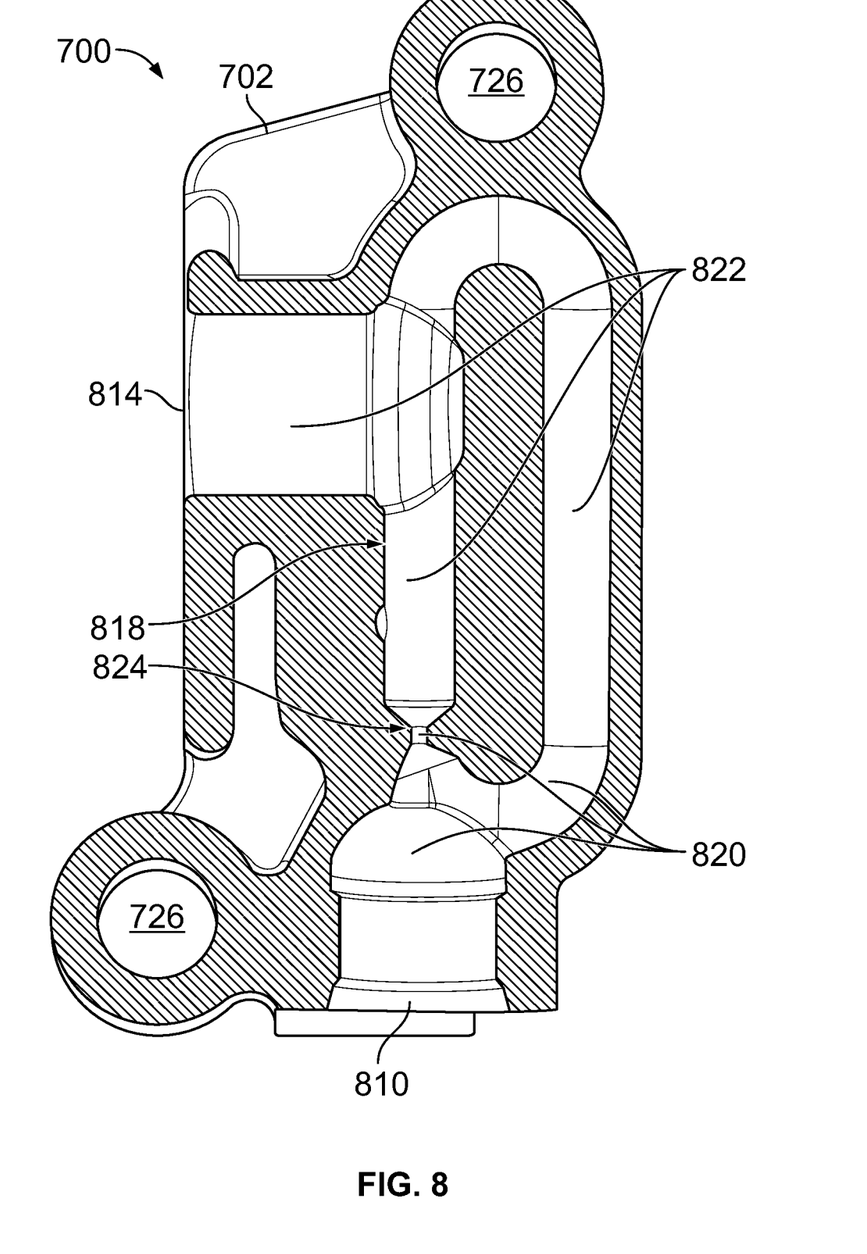
FIG. 8 illustrates a cross-sectional view of the device shown in FIG. 7.

FIG. 7 illustrates a front elevational view of another example of a leak detection and/or direction device 700. FIG. 8 illustrates a cross-sectional view of the device shown in FIG. 7. Similar to the devices 100, 200, 300, 400, the device 700 can be additively manufactured by successively printing or laying individual layers of material on top of each other to form a monolithic, optionally homogeneous, and/or seamless body. The device can be mounted to a powered system, such as a vehicle, in a location where leaks of a fluid can be directed for detection and optionally to be directed by the device back to a source of the fluid or another container.

The device includes an additively manufactured body 702 having multiple fluid inputs 704 (e.g., inputs 704A-C). The fluid inputs can represent the fluid inputs 104 described above. While three fluid inputs are shown, the body may include one or two fluid inputs, or more than three fluid inputs. Each of the fluid inputs can be fluidly coupled with other conduits 106 (shown in FIG. 1) that separately direct fluid leaks from different locations in a powered system (e.g., a vehicle) to the same internal conduit or channel 818 (shown in FIG. 8) of the body. For example, the inputs 704 may combine with each other inside the body 702 prior to reaching or at an interface with the internal conduit 818. The internal conduit 818 can represent the internal conduit 118 described above.

The body includes at least one drain 810 (shown in FIG. 8) that can represent the drain 110. The drain can be fluidly coupled with the first container and/or a different, second container by one or more conduits, as described above. The body may include at least one sensor conduit input 814 (shown in FIG. 8) that represents the sensor conduit input 114. The sensor conduit input can be fluidly coupled with at least one sensor 116, as described above.

The body includes the internal conduit that is fluidly coupled with and extends between the fluid input(s), the drain(s), and the sensor conduit input(s). This internal conduit can be formed as an open internal passageway within the body that directs the flow of the leaking fluid within the body. The internal conduit includes lower branches 820 and upper branches 822 (shown in FIG. 8). The lower branches of the internal conduit extend in the body below the fluid input from the fluid input to the drain. In the illustrated embodiment, the lower branches of the internal conduit extend from the fluid input to the drain without intersecting or passing through the sensor input. The upper branches of the internal conduit separately extend in the body above the fluid inputs from the fluid input, through (or intersecting with) the sensor conduit input, above the sensor conduit input, and down to the drain. The upper branches may not extend below the fluid input from the fluid input to the drain. The upper branches can be above at least part of the lower branches relative to the direction in which gravity pulls on the fluid inside the internal conduit.

The lower branches of the internal conduit can include a reduced flow portion 824 (shown in FIG. 8), which represents the reduced flow portion 124. The reduced flow portion of the lower branches includes a section of the internal conduit in the lower branches that has a smaller cross-sectional area than other sections of the lower branches and/or than the upper branches of the internal conduit, as described above.

As shown, at least some of the fluid inputs can be disposed in the body above the drain but below the sensor conduit input in the body. In operation, the fluid inputs receive a fluid leak. The fluid leak may initially flow down in the lower branches of the internal conduit from one or more of the fluid inputs toward the reduced flow portion of the lower branches due to the pull of gravity. The reduced flow portion of the lower branches can at least partially back-up flow of the fluid leak within the internal conduit so that the fluid leak in the internal conduit accumulates, builds up, etc., and reaches the sensor conduit, as described above.

The body includes several mounting holes 726. These holes may be formed during the additive manufacture of the body in locations that allow for fasteners (e.g., bolts, screws, pins, etc.) to be placed through the mounting holes to secure the body to a surface (e.g., in the powered system).

The inventive subject matter described herein also includes a method for providing one or more of the leak detection and/or direction devices described herein. While the method includes operations for the additive manufacturing of the devices, at least one embodiment of the devices includes manufacturing the devices in another manner, such as casting or coupling discrete or separate components together.

The method includes additively manufacturing a body having at least one fluid input configured to receive a fluid leak from a first source container, at least one drain configured to be fluidly coupled with one or more of the first source container or a different, second source container, at least one sensor conduit input configured to be fluidly coupled with at least one sensor, and an internal conduit that fluidly couples the inputs and drain (and that may include a restricted flow portion). The additive manufacturing can involve successively depositing layers of material used to form the body on top of each other or above each other. For example, a first layer of material can be deposited on a build surface, followed by a second layer (which may have a different shape than the first layer) being deposited (e.g., printed) at least partially above the first layer, and so on, with successive layers until the body is fully formed.

In one embodiment, a leak detection device includes a body having at least one fluid input configured to receive a fluid leak from a first source container, at least one drain configured to be fluidly coupled with one or more of the first container that is a source of the fluid leak or a different, second source container, and at least one sensor conduit input configured to be fluidly coupled with at least one sensor. The at least one fluid input is disposed in the body above the at least one drain but below the at least one sensor conduit input in the body. The body includes an internal conduit that is fluidly coupled with and extends between the at least one fluid input, the at least one drain, and the at least one sensor conduit input. The internal conduit includes a lower branch that extends in the body below the at least one fluid input to the at least one drain. The internal conduit includes an upper branch that separately extends in the body above the at least one sensor conduit input to the at least one drain. The lower branch of the internal conduit includes a reduced flow portion having a smaller cross-sectional size than the upper branch of the internal conduit. The internal conduit has the reduced flow portion below the at least one fluid input and the at least one sensor conduit input but above the at least one drain.

Optionally, the at least one fluid input of the body is configured to receive the fluid leak and the lower branch of the internal conduit is configured to partially back-up flow of the fluid leak within the internal conduit so that the fluid leak in the internal conduit reaches the at least one sensor conduit. The upper branch of the internal conduit in the body can be shaped to direct the fluid leak in the internal conduit above the at least one sensor conduit input and to the at least one drain responsive to a rate of flow of the fluid leak received by the at least one fluid input exceeding a designated threshold. The at least one fluid input in the body can include plural different fluid inputs configured to be separately coupled with the first source container of the fluid leak and fluidly coupled with the internal conduit in the block.

The internal conduit in the body can form a continuous loop that fluidly couples the at least one fluid input, the at least one sensor conduit input, and the at least one drain. The at least one drain of the body can be configured to be fluidly coupled with the first source container such that the fluid leak flowing through the internal conduit in the body is returned to the first source container.

The at least one sensor conduit input of the body can be configured to be coupled with a sensor that detects a presence of the fluid leak in the internal conduit of the body. The at least one sensor conduit input of the body can include a first sensor conduit input and a second sensor conduit input. The first sensor conduit input can be configured to be coupled with a fluid sensor that detects a presence of the fluid leak in the internal conduit of the body. The second sensor conduit input can be configured to be coupled with a pressure sensor that detects a pressure of the fluid leak in the internal conduit of the body.

The reduced flow portion of the lower branch of the internal conduit can be a first reduced flow portion, and the internal conduit can include a second reduced flow portion disposed below the second sensor conduit input. The body can be a monolithic body that does not include any seams or interfaces between different portions of the body. The at least one fluid input of the block can be configured to be fluidly coupled with a fuel line of a vehicle.

The at least one drain of the block can be fluidly coupled with one or more of a fuel tank of the vehicle, an engine sump, or a waste container as the one or more of the first container or the different, second source container. Optionally, the at least one drain includes multiple drains configured to direct fluid within the internal conduit out of the block and to the one or more of the first source container or the different, second source container. The at least one drain can be located below the at least one fluid input in the body. Alternatively, the at least one drain is located above the at least one fluid input in the body. In another embodiment, one drain can be below the fluid input and another drain can be above the fluid input.

In one embodiment, a method includes additively manufacturing a body having at least one fluid input configured to receive a fluid leak from a first source container, at least one drain configured to be fluidly coupled with one or more of the first source container or a different, second source container, and at least one sensor conduit input configured to be fluidly coupled with at least one sensor. The at least one fluid input is additively manufactured in the body above the at least one drain but below the at least one sensor conduit input in the body. The body is additively manufactured to include an internal conduit that is fluidly coupled with and extends between the at least one fluid input, the at least one drain, and the at least one sensor conduit input. The internal conduit is additively manufactured to include a lower branch that extends in the body below the at least one fluid input to the at least one drain. The internal conduit is additively manufactured to include an upper branch that separately extends in the body above the at least one sensor conduit input to the at least one drain. The lower branch of the internal conduit is additively manufactured to include a reduced flow portion having a smaller cross-sectional size than the upper branch of the internal conduit. The internal conduit is additively manufactured to have the reduced flow portion below the at least one fluid input and the at least one sensor conduit input but above the at least one drain.

Optionally, the body is additively manufactured such that the at least one fluid input of the body is configured to receive the fluid leak and the lower branch of the internal conduit is configured to partially back-up flow of the fluid leak within the internal conduit so that the fluid leak in the internal conduit reaches the at least one sensor conduit. The upper branch of the internal conduit in the body can be additively manufactured to have a shape that directs the fluid leak in the internal conduit above the at least one sensor conduit input and to the at least one drain responsive to a rate of flow of the fluid leak received by the at least one fluid input exceeding a designated threshold.

The body can be additively manufactured so that the at least one fluid input in the body includes plural different fluid inputs configured to be separately coupled with the first source container of the fluid leak and fluidly coupled with the internal conduit in the block. The internal conduit in the body can be additively manufactured to form a continuous loop that fluidly couples the at least one fluid input, the at least one sensor conduit input, and the at least one drain.

The at least one drain of the body can be additively manufactured to be fluidly coupled with the first source container such that the fluid leak flowing through the internal conduit in the body is returned to the first source container. The at least one sensor conduit input of the body can be additively manufactured to be coupled with a sensor that detects a presence of the fluid leak in the internal conduit of the body. The at least one sensor conduit input of the body can be additively manufactured to include a first sensor conduit input and a second sensor conduit input. The first sensor conduit input can be coupled with a fluid sensor that detects a presence of the fluid leak in the internal conduit of the body. The second sensor conduit input can be coupled with a pressure sensor that detects a pressure of the fluid leak in the internal conduit of the body.

The internal conduit can be additively manufactured to have a first reduced flow portion and a second reduced flow portion disposed below the second sensor conduit input.

In one embodiment, a vehicle fuel leak detection device includes a body having at least one fluid input configured to receive a fuel leak onboard a vehicle, at least one drain configured to be fluidly coupled with a fuel tank of the fuel, and a first sensor conduit input configured to be fluidly coupled with a fluid sensor. The at least one fluid input is disposed in the body above the at least one drain but below the at least one sensor conduit input in the body. The body includes an internal conduit raceway that is fluidly coupled with and extends between the at least one fluid input, the at least one drain, and the at least one sensor conduit input. The internal conduit includes a lower branch that extends in the body below the at least one fluid input to the at least one drain. The internal conduit includes an upper branch that separately extends in the body above the at least one sensor conduit input to the at least one drain. The lower branch of the internal conduit includes a reduced flow portion having a smaller cross-sectional size than the upper branch of the internal conduit. The internal conduit has the reduced flow portion below the at least one fluid input and the at least one sensor conduit input but above the at least one drain.

Optionally, the at least one fluid input of the body can be configured to receive the fuel leak and the lower branch of the internal conduit can be configured to partially back-up flow of the fuel leak within the internal conduit so that the fuel leak in the internal conduit reaches the at least one sensor conduit. The at least one fluid input in the body can include plural different fluid inputs of the fuel leak. The internal conduit in the body can form a continuous loop that fluidly couples the at least one fluid input, the at least one sensor conduit input, and the at least one drain.

The at least one sensor conduit input of the body can include a first sensor conduit input and a second sensor conduit input. The first sensor conduit input can be configured to be coupled with a fluid sensor that detects a presence of the fuel leak in the internal conduit of the body. The second sensor conduit input can be configured to be coupled with a pressure sensor that detects a pressure of the fuel leak in the internal conduit of the body. The body can be a monolithic body that does not include any seams or interfaces between different portions of the body.

As described above, the sensors can generate output (e.g., electric signals) representative of measured, sensed, or detected characteristics. This output can be provided to a processor, computer, or the like, for analysis to detect fluid, identify fluid, and/or determine how much fluid is leaking.

As used herein, the terms "processor" and "computer," and related terms, e.g., "processing device," "computing device," and "controller" may be not limited to just those integrated circuits referred to in the art as a computer, but refer to a microcontroller, a microcomputer, a programmable logic controller (PLC), field programmable gate array, and application specific integrated circuit, and other programmable circuits. Suitable memory may include, for example, a computer-readable medium. A computer-readable medium may be, for example, a random-access memory (RAM), a computer-readable non-volatile medium, such as a flash memory. The term "non-transitory computer-readable media" represents a tangible computer-based device implemented for short-term and long-term storage of information, such as, computer-readable instructions, data structures, program modules and sub-modules, or other data in any device. Therefore, the methods described herein may be encoded as executable instructions embodied in a tangible, non-transitory, computer-readable medium, including, without limitation, a storage device and/or a memory device. Such instructions, when executed by a processor, cause the processor to perform at least a portion of the methods described herein. As such, the term includes tangible, computer-readable media, including, without limitation, non-transitory computer storage devices, including without limitation, volatile and non-volatile media, and removable and non-removable media such as firmware, physical and virtual storage, CD-ROMS, DVDs, and other digital sources, such as a network or the Internet.

The singular forms "a", "an", and "the" include plural references unless the context clearly dictates otherwise. "Optional" or "optionally" means that the subsequently described event or circumstance may or may not occur, and that the description may include instances where the event occurs and instances where it does not. Approximating language, as used herein throughout the specification and claims, may be applied to modify any quantitative representation that could permissibly vary without resulting in a change in the basic function to which it may be related. Accordingly, a value modified by a term or terms, such as "about," "substantially," and "approximately," may be not to be limited to the precise value specified. In at least some instances, the approximating language may correspond to the precision of an instrument for measuring the value. Here and throughout the specification and claims, range limitations may be combined and/or interchanged, such ranges may be identified and include all the sub-ranges contained therein unless context or language indicates otherwise.

This written description uses examples to disclose the embodiments, including the best mode, and to enable a person of ordinary skill in the art to practice the embodiments, including making and using any devices or systems and performing any incorporated methods. The claims define the patentable scope of the disclosure, and include other examples that occur to those of ordinary skill in the art. Such other examples are intended to be within the scope of the claims if they have structural elements that do not differ from the literal language of the claims, or if they include equivalent structural elements with insubstantial differences from the literal language of the claims.

What is claimed is:

1. A leak detection device comprising:
a body having at least one fluid input configured to receive a fluid leak from a first source container, at least one drain configured to be fluidly coupled with one or more of the first container that is a source of the fluid leak or a different, second source container, and at least one sensor conduit input configured to be fluidly coupled with at least one sensor,
the at least one fluid input disposed in the body above the at least one drain but below the at least one sensor conduit input in the body,
the body including an internal conduit that is fluidly coupled with and extends between the at least one fluid input, the at least one drain, and the at least one sensor conduit input, the internal conduit including a lower branch that extends in the body below the at least one fluid input to the at least one drain, the internal conduit including an upper branch that separately extends in the body above the at least one sensor conduit input to the at least one drain,
the lower branch of the internal conduit including a reduced flow portion having a smaller cross-sectional size than the upper branch of the internal conduit, the internal conduit having the reduced flow portion below the at least one fluid input and the at least one sensor conduit input but above the at least one drain.

2. The leak detection device of claim 1, wherein the at least one fluid input of the body is configured to receive the fluid leak and the lower branch of the internal conduit is configured to partially back-up flow of the fluid leak within the internal conduit so that the fluid leak in the internal conduit reaches the at least one sensor conduit.

3. The leak detection device of claim 1, wherein the upper branch of the internal conduit in the body is shaped to direct the fluid leak in the internal conduit above the at least one sensor conduit input and to the at least one drain responsive to a rate of flow of the fluid leak received by the at least one fluid input exceeding a designated threshold.

4. The leak detection device of claim 1, wherein the at least one fluid input in the body includes plural different fluid inputs configured to be separately coupled with the first source container of the fluid leak and fluidly coupled with the internal conduit in the block.

5. The leak detection device of claim 1, wherein the internal conduit in the body forms a continuous loop that fluidly couples the at least one fluid input, the at least one sensor conduit input, and the at least one drain.

6. The leak detection device of claim 1, wherein the at least one drain of the body is configured to be fluidly coupled with the first source container such that the fluid leak flowing through the internal conduit in the body is returned to the first source container.

7. The leak detection device of claim 1, wherein the at least one sensor conduit input of the body is configured to be coupled with a sensor that detects a presence of the fluid leak in the internal conduit of the body.

8. The leak detection device of claim 1, wherein the at least one sensor conduit input of the body includes a first sensor conduit input and a second sensor conduit input, the first sensor conduit input configured to be coupled with a fluid sensor that detects a presence of the fluid leak in the internal conduit of the body, the second sensor conduit input configured to be coupled with a pressure sensor that detects a pressure of the fluid leak in the internal conduit of the body.

9. The leak detection device of claim 1, wherein the at least one drain includes multiple drains configured to direct fluid within the internal conduit out of the block and to the one or more of the first source container or the different, second source container.

10. The leak detection device of claim 1, wherein the at least one drain is located one or more of below the at least one fluid input in the body or above the at least one fluid input in the body.

11. A method comprising:
additively manufacturing a body having at least one fluid input configured to receive a fluid leak from a first source container, at least one drain configured to be fluidly coupled with one or more of the first source container or a different, second source container, and at least one sensor conduit input configured to be fluidly coupled with at least one sensor,
the at least one fluid input additively manufactured in the body above the at least one drain but below the at least one sensor conduit input in the body,
the body additively manufactured to include an internal conduit that is fluidly coupled with and extends between the at least one fluid input, the at least one drain, and the at least one sensor conduit input, the internal conduit additively manufactured to include a lower branch that extends in the body below the at least one fluid input to the at least one drain, the internal conduit additively manufactured to include an upper branch that separately extends in the body above the at least one sensor conduit input to the at least one drain,
the lower branch of the internal conduit additively manufactured to include a reduced flow portion having a smaller cross-sectional size than the upper branch of the internal conduit, the internal conduit additively manufactured to have the reduced flow portion below the at least one fluid input and the at least one sensor conduit input but above the at least one drain.

12. The method of claim 11, wherein the body is additively manufactured such that the at least one fluid input of the body is configured to receive the fluid leak and the lower branch of the internal conduit is configured to partially back-up flow of the fluid leak within the internal conduit so that the fluid leak in the internal conduit reaches the at least one sensor conduit.

13. The method of claim 11, wherein the upper branch of the internal conduit in the body is additively manufactured to have a shape that directs the fluid leak in the internal conduit above the at least one sensor conduit input and to the at least one drain responsive to a rate of flow of the fluid leak received by the at least one fluid input exceeding a designated threshold.

14. The method of claim 11, wherein the body is additively manufactured so that the at least one fluid input in the body includes plural different fluid inputs configured to be separately coupled with the first source container of the fluid leak and fluidly coupled with the internal conduit in the block.

15. A vehicle fuel leak detection device comprising:
a body having at least one fluid input configured to receive a fuel leak onboard a vehicle, at least one drain configured to be fluidly coupled with a fuel tank of the fuel, and a first sensor conduit input configured to be fluidly coupled with a fluid sensor,
the at least one fluid input disposed in the body above the at least one drain but below the at least one sensor conduit input in the body,
the body including an internal conduit raceway that is fluidly coupled with and extends between the at least one fluid input, the at least one drain, and the at least one sensor conduit input, the internal conduit including a lower branch that extends in the body below the at least one fluid input to the at least one drain, the internal conduit including an upper branch that separately extends in the body above the at least one sensor conduit input to the at least one drain,
the lower branch of the internal conduit including a reduced flow portion having a smaller cross-sectional size than the upper branch of the internal conduit, the internal conduit having the reduced flow portion below the at least one fluid input and the at least one sensor conduit input but above the at least one drain.

16. The vehicle fuel leak detection device of claim 15, wherein the at least one fluid input of the body is configured to receive the fuel leak and the lower branch of the internal conduit is configured to partially back-up flow of the fuel leak within the internal conduit so that the fuel leak in the internal conduit reaches the at least one sensor conduit.

17. The vehicle fuel leak detection device of claim 15, wherein the at least one fluid input in the body includes plural different fluid inputs of the fuel leak.

18. The vehicle fuel leak detection device of claim 15, wherein the internal conduit in the body forms a continuous loop that fluidly couples the at least one fluid input, the at least one sensor conduit input, and the at least one drain.

19. The vehicle fuel leak detection device of claim 15, wherein the at least one sensor conduit input of the body includes a first sensor conduit input and a second sensor conduit input, the first sensor conduit input configured to be coupled with a fluid sensor that detects a presence of the fuel leak in the internal conduit of the body, the second sensor conduit input configured to be coupled with a pressure sensor that detects a pressure of the fuel leak in the internal conduit of the body.

20. The vehicle fuel leak detection device of claim 15, wherein the body is a monolithic body that does not include any seams or interfaces between different portions of the body.

* * * * *